July 5, 1960 W. O. WEBBER 2,944,010
METHOD AND APPARATUS FOR TREATING HYDROCARBONS
Filed Dec. 6, 1957 2 Sheets-Sheet 1

FIG. 1.

INVENTOR.
WILLIAM O. WEBBER,
BY
ATTORNEY.

United States Patent Office 2,944,010
Patented July 5, 1960

2,944,010
METHOD AND APPARATUS FOR TREATING HYDROCARBONS

William O. Webber, Baytown, Tex., assignor, by mesne assignments, to Esso Research and Engineering Company, Elizabeth, N.J., a corporation of Delaware Filed Dec. 6, 1957, Ser. No. 701,088

16 Claims. (Cl. 208—177)

The present invention is directed to a method and apparatus for admixing and separating immiscible liquids. More particularly, the invention is directed to a method for treating a hydrocarbon with a liquid immiscible with the hydrocarbon. In its more specific aspects the invention is concerned with method and apparatus for removing deleterious substances from hydrocarbons.

The present invention may be briefly described as a method for admixing and separating inmmiscible liquids or for treating immiscible liquids which comprises flowing a first liquid through a restricted zone. Introduced into the first liquid as it flows through the vena contracta of the restricted zone is a second liquid immiscible in the first liquid which is introduced at a plurality of circumferentially spaced apart points to form a mixture of the liquids. The mixture is then flowed through a horizontal elongated zone and the mixture is coagulated as it flows through the elongated zone. Thereafter, the coagulated mixture is settled into the first and second liquids.

The invention also includes apparatus for admixing and separating immiscible liquids or for treating one liquid with another immiscible liquid. The apparatus comprises, in combination, a restriction means which suitably may be fluid pressure operated valve having an inlet and an outlet. Means are provided for introducing a first fluid into the inlet of the fluid pressure operated valve and a tubular ring provided with a plurality of circumferentially spaced apart connections fluidly communicates with the vena contracta of the valve. Means are provided for introducing into the ring a second fluid immiscible in the first fluid. A horizontally arranged tubular member is connected by its first end to the outlet of the valve and spaced apart orifices are arranged in the horizontal tubular member. A settling vessel connects to the second end of the horizontal tubular member for separation of the fluids.

By vena contracta is meant, in a hydraulic sense, any of the contracted parts of minimum size of a jet of fluid discharging from an orifice or an aperture. For example, a fluid pressure diaphragm operated valve has a vena contracta below the seat of the valve.

One of the immiscible liquids may suitably be a liquid hydrocarbon boiling in the range from about 80° up to about 750° F. As exemplary of such liquid hydrocarbons may be mentioned the pentanes, the hydrocarbons in the gasoline and kerosene boiling range, and the gas oil hydrocarbons. The hydrocarbon may be a pure hydrocarbon or a mixture of hydrocarbons.

The hydrocarbon may be treated for removal of impurities, such as hydrogen sulfide, mercaptans and other impurities which are normally removed in the refining of hydrocarbons.

The liquid immiscible in the hydrocarbon or in the first liquid may suitably be a liquid treating reagent, such as a sodium hydroxide or caustic solution or may be an alkaline hypochlorite solution, such as sodium hypochlorite. Suitably, the liquid may be water or an aqueous or an alcoholic solution which may be used to treat or wash hydrocarbons. The immiscible liquid may be an acid, such as a sulfuric acid, and the like, or may be any of the numerous liquid treating reagents used in a modern petroleum refinery.

The present invention will be further illustrated by reference to the drawing in which:

Fig. 1 is a flow diagram of a preferred mode; and

Figure 2:
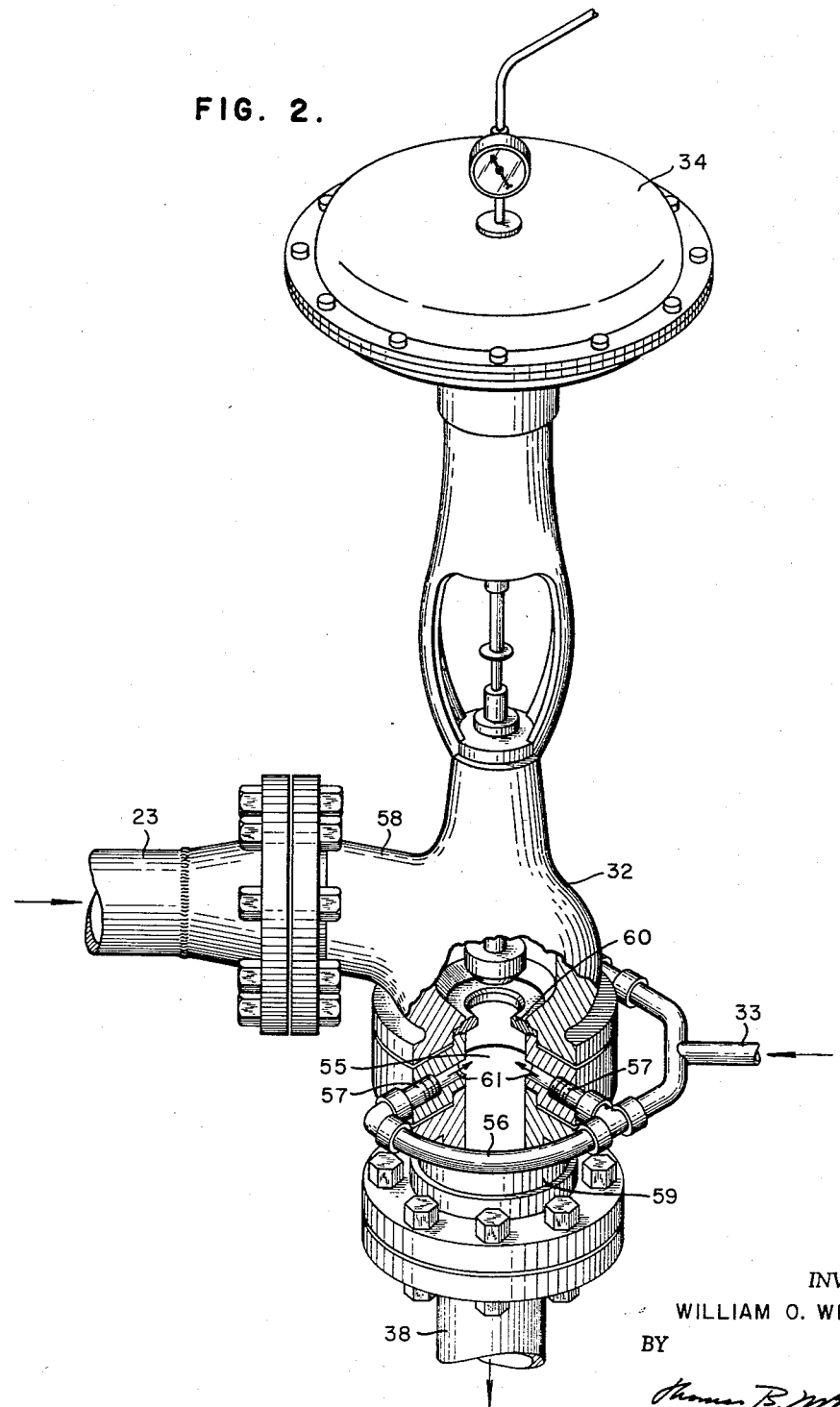
Fig. 2 is an enlarged partial cut-away view in perspective showing the ring and the valve employed to form the mixture.

Referring now to the drawing in which identical numerals will be employed to designate identical parts, numeral 11 designates a feed line by way of which a feed hydrocarbon, such as a pentane fraction or a stable naphtha may be introduced into the system from a source, not shown. The feed hydrocarbon, by way of line 11, is introduced into the inlet of a fluid pressure operated valve, such as a diaphragm valve 12, which is provided with a diaphragm 13 and a differential pressure control means 14 which operates on differential pressure between the pressure taps 15 and 16. The feed hydrocarbon flows into the inlet of valve 12 and is admixed with an immiscible liquid or treating solution, in this instance caustic solution introduced by line 17 from a source which will be described further. By virtue of introducing the caustic solution into the vena contracta of the valve 12, an efficient mixing of the feed hydrocarbon with the caustic solution is effected. The mixture then flows from the outlet of the valve 12 by way of line 18 through first and second orifices 19 and 20 and thence by way of line 21 into a settling zone 22. The partially treated naphtha flows from settling zone 22, which is of sufficient size and capacity to make a separation between the hydrocarbon and the caustic solution, by way of line 23, for further treatment as will be described. The caustic solution separated in settler 22 is withdrawn by way of line 24 and flows through a liquid level control valve 25 to a pump 26 which pumps the caustic solution through line 27 into branch line 28, controlled by valve 29, into line 17. It is to be noted that line 27 is provided with a valve 30 for discard of a portion of the used caustic solution and that line 17 is provided with a valve 31 for introducing fresh or makeup caustic solution. The circulating caustic solution may have a Baumé gravity of about 18° which suitably may range from about 15° to about 20° Baumé. The purpose of this caustic treatment is to remove hydrogen sulfide and low molecular weight mercaptans from the feed hydrocarbon.

The treated hydrocarbon in line 23 from which hydrogen sulfide has been substantially removed, flows by way of line 23 into a second diaphragm valve 32 which may be identical to diaphragm valve 12. In this particular instance, an alkaline hypochlorite solution, such as sodium hypochlorite, is introduced by line 33 into the vena contracta of the valve 32, the valve 32 being provided with a diaphragm 34 and a differential pressure control means 35 operated from the pressure taps 36 and 37.

The outlet from valve 32 is connected to line 38, and the mixture of hypochlorite solution and treated naphtha flows through line 38 and through orifices 39 and 40 and thence by way of line 41 into a settling zone 42, which is similar in size and capacity to settler 22. The treated and settled naphtha is withdrawn from settler 42 by way of line 43. The used hypochlorite solution is withdrawn from settler 42 by way of line 44, controlled by a liquid level control valve 45 and is pumped by way of pump 46 into line 47 and thence by branch line 48, controlled by valve 49, into line 33. It is to be noted that line 47 is provided with a valve 50 for discard of a portion of the used hypochlorite solution and line 33 is provided with a valve 51 for introduction of fresh or regenerated hypochlorite solution.

The circulating hypochlorite solution may have an alkalinity in the range from about 100 to about 175 grams/liter and may have an available chlorine content in the range from about 0.1 to about 100 grams/liter.

By virtue of the admixing and separating device of the present invention, the treated and settled oil is treated efficiently with a minimum amount and consumption of the treating reagents.

Referring now to Fig. 2, the treated oil from the settler 22 flows by way of line 23 into the valve 32, which is provided with a diaphragm 34. Connected into the vena contracta 55 of the valve 32 is a ring 56, provided with a plurality of circumferentially arranged fluid communication connections 57, which may be four in number. The ring 56 fluidly communicates with line 33 by way of which the hypochlorite solution is introduced into the ring 56 and thence to the vena contracta 55. It is to be noted that the line 23 connects into the inlet 58 of the valve 32 and that the outlet 59 connects into the line 38 containing the orifices 39 and 40. As shown clearly in the cut-away portions of the valve 32, the valve 32 is provided with a seat 60 and the fluid communication means 57 are connected by means of ports 61 into the vena contracta 55 of the valve 32.

By virtue of apparatus and method as described herein efficient mixing, settling, coagulating, and treatment are obtained between hydrocarbons and immiscible treating reagents.

In the practice of the present invention a large volume of oil is jetted through an orifice or restriction means and a treating solution, such as has been illustrated, is introduced around the vena contracta where the oil flow necks down and thus the treating solution is educted into the fast flowing oil. The valve with the ring immediately downstream of the valve plug, by means of which the mixing is obtained, provides for efficient and rapid mixing of the hydrocarbon and treating reagent. By virtue of employing eductive mixing, a smaller and more uniform size of droplet is formed than otherwise. In many mixing devices a wide range of droplets may occur and a settler which follows must be properly sized to provide the necessary time for settling of the small droplets, which may be as much as ten times the time required to settle the larger droplets. In the present invention, the small droplets are made to coagulate with other small droplets or with larger droplets, and the settling is made efficient and rapid. This is accomplished in the present invention by providing two orifices in the lines 38 and 18 to cause coagulation. As examples, the first orifice such as 39 may have a diameter of about 1.29" and provide about four pounds pressure drop, while the second orifice may be somewhat larger, about 1.47" in diameter and provide about a two pound pressure drop. The pressure drop through the first orifice may range from about 2 to about 10 pounds while the pressure drop through the second orifice may range from about ¼ to about 4 pounds, the orifices being suitably sized to obtain the desired pressure drop at the prevailing flow rates. These coagulative orifices increase the efficiency by coagulating the droplets such that when the coagulated mixture is introduced into the settling zone the settling into the phases of the mixture is more rapid and efficient than heretofore.

In employing the present invention where hydrocarbons containing mercaptans are treated to convert sour mercaptans to disulfides with a strong hypochlorite solution, the sweetening reaction is quite rapid. However, along with the sweetening reaction is a parallel reaction wherein the strong available chlorine in the treating solution chlorinates some of the hydrocarbons present. The chlorination reaction is very rapid and may consume about 75 percent of the available chlorine, making it necessary sometimes to use about four times as much chlorine as that theoretically required to convert mercaptans to disulfides. These reactions occur because of the large surface of contact between aqueous and oil phases, this surface being greater when the size of the aqueous droplets is small. By employing the present invention in which a restriction means, such as a valve of the nature described, is followed with a coagulative orifice plate or plates, the droplets are enlarged, the surface reduced, and the reaction is effectively stopped. This reduces the consumption of chlorine and increases the efficiency of the hypochlorite treating process, thereby reducing the cost of operation and eliminating chlorinated hydrocarbons from the finished product.

As an example of the practice of the present invention, in a commercial operation, pentanes were being treated with an alkaline hypochlorite solution. By employing the present invention, the chlorine consumption was reduced about 50 percent based on the measured reduction of strong hypochlorite solution makeup from about 1 gallon per minute to about 0.5 gallon per minute. In short, the present invention is quite effective and useful and advantageous over the prior art in that efficient mixing and coagulation means and methods are provided.

The nature and objects of the present invention having been completely described and illustrated, what I wish to claim as new and useful and secure by Letters Patent is:

1. A method for admixing and separating immiscible liquids which comprises flowing a first liquid hydrocarbon through a restricted zone, introducing into said first liquid hydrocarbon as it flows through the vena contracta of said zone a second liquid treating agent immiscible in the first liquid hydrocarbon at a plurality of circumferentially spaced apart points to form a mixture of small and uniform size droplets of said liquids, flowing the mixture through an elongated zone, coagulating the mixture as it flows through said elongated zone, and then settling the coagulated mixture into said first and second liquids.

2. A method for admixing and separating immiscible liquids which comprises flowing a first liquid hydrocarbon through a restricted zone, introducing into said first liquid hydrocarbon as it flows through the vena contracta of said zone a second liquid treating agent immiscible in the first liquid hydrocarbon at a plurality of circumferentially spaced apart points to form a mixture of small and uniform size droplets of said liquids, flowing the mixture through a horizontal elongated zone, coagulating the mixture at spaced apart points as it flows through said elongated zone, and then settling the coagulated mixture into said first and second liquids.

3. A method for admixing and separating immiscible liquids which comprises flowing a first liquid hydrocarbon through a restricted zone, introducing into said first liquid hydrocarbon as it flows through the vena contracta of said zone a second liquid treating agent immiscible in the first liquid hydrocarbon at a plurality of circumferentially spaced apart points to form a mixture of small and uniform size droplets of said liquids, flowing the mixture through a horizontal elongated zone, coagulating the mixture at spaced apart points by progressively decreasing the pressure drop across restricted areas in said elongated zone as the mixture flows through said elongated zone, and then settling the coagulated mixture into said first and second liquids.

4. A method for treating a liquid hydrocarbon which comprises flowing said liquid hydrocarbon through a restricted zone, introducing into said liquid hydrocarbon as it flows through the vena contracta of said zone a liquid treating agent immiscible in the liquid hydrocarbon at a plurality of circumferentially spaced apart points to form a mixture of small and uniform size droplets of said liquid hydrocarbon and introduced liquid, flowing the mixture through an elongated zone, coagulating the mixture as it flows through said elongated zone, and then settling the coagulated mixture into said liquid hydrocarbon and introduced liquid.

5. A method for treating hydrocarbons which comprises flowing a liquid hyrocarbon boiling up to about 750° F. through a restricted zone, introducing into said liquid hydrocarbon as it flows through the vena contracta of said zone an aqueous alkaline hypochlorite solution at a plurality of circumferentially spaced apart points to form a mixture of small and uniform size droplets of said hydrocarbon and solution, flowing the mixture through a horizontal elongated zone, coagulating the mixture as it flows through said elongated zone, and then settling the coagulated mixture into a treated hydrocarbon phase and a solution phase.

6. A method in accordance with claim 5 in which the liquid hydrocarbon is a pentane.

7. A method in accordance with claim 5 in which the liquid hydrocarbon is naphtha.

8. A method in accordance with claim 5 in which the hypochlorite solution is sodium hypochlorite.

9. A method for treating a liquid hydrocarbon which comprises flowing said liquid hydrocarbon through a restricted zone, introducing into said liquid hydrocarbon as it flows through the vena contracta of said zone a liquid treating reagent immiscible in the liquid hydrocarbon at a plurality of circumferentially spaced apart points to form a mixture of small and uniform size droplets of said liquid hydrocarbon and treating reagent, flowing the mixture through a horizontal elongated zone, coagulating the mixture as it flows through said elongated zone, and then settling the coagulating mixture into a treated hydrocarbons phase and a treating reagent phase.

10. A method in accordance with claim 9 in which the treating reagent is a sodium hydroxide solution.

11. A method in accordance with claim 9 in which the treating reagent is a sodium hypochlorite solution.

12. Apparatus for admixing and separating immiscible liquids which comprises, in combination, a restriction means having an inlet and an outlet, means for introducing a first fluid into the inlet of said restriction means, a tubular ring provided with a plurality of circumferentially spaced apart connections fluidly communicating with the vena contracta of said restriction means, means for introducing into said ring a second fluid immiscible in the first fluid, a tubular member connected by its first end to the outlet of said restriction means, spaced apart orifices arranged in the tubular member, and a settling vessel connected to the second end of said tubular member.

13. Apparatus for admixing and separating immiscible liquids which comprises, in combination, a fluid pressure operated valve having an inlet and an outlet, means for introducing a first fluid into the inlet of said valve, a tubular ring provided with a plurality of circumferentially spaced apart connections fluidly communicating with the vena contracta of said valve, means for introducing into said ring a second fluid immiscible in the first fluid, a horizontally arranged tubular member connected by its first end to the outlet of said valve, spaced apart orifices arranged in the horizontal tubular member, and a settling vessel connected to the second end of said horizontal tubular member.

14. Apparatus for admixing and separating immiscible liquids which comprises, in combination, a fluid pressure diaphragm operated valve having an inlet and an outlet, a pipe connected to said valve for introducing a first fluid into the inlet of said valve, a tubular ring provided with a plurality of circumferentially spaced apart connections fluidly communicating with the vena contracta of said valve, a pipe connected to said ring for introducing into said ring a second fluid immiscible in the first fluid, a horizontally arranged tubular member connected by its first end to the outlet of said valve, spaced apart orifices arranged in the horizontal tubular member, and a settling vessel connected to the second end of said horizontal tubular member.

15. Apparatus for admixing and separating immiscible liquids which comprises, in combination, a fluid pressure operated valve having an inlet and an outlet, the outlet of said valve forming a right angle with the inlet of said valve, a horizontal pipe connected to said inlet for introducing a first fluid into said valve, a tubular ring provided with a plurality of circumferentially spaced apart connections fluidly communicating with the vena contracta of said valve, a pipe connected to said ring for introducing into said ring a second fluid immiscible in the first fluid, a horizontally arranged tubular member connected by its first end to the outlet of said valve, spaced apart orifices arranged in the horizontal tubular member, and a settling vessel connected to the second end of said horizontal tubular member.

16. A method in accordance with claim 4 in which the introduced liquid is reactable with a component of the liquid hydrocarbon.

References Cited in the file of this patent

UNITED STATES PATENTS

| | | |
|---|---|---|
| 2,057,918 | Ridgway | Oct. 20, 1936 |
| 2,331,518 | Trier et al. | Oct. 12, 1943 |
| 2,361,150 | Petroe | Oct. 24, 1944 |
| 2,608,523 | Waddell et al. | Aug. 26, 1952 |
| 2,679,470 | Kress | May 25, 1954 |
| 2,768,123 | Trusty et al. | Oct. 23, 1956 |
| 2,773,019 | Waddell | Dec. 4, 1956 |
| 2,775,542 | Carver | Dec. 25, 1956 |
| 2,775,543 | Carver et al. | Dec. 25, 1956 |
| 2,820,700 | Saxton | Jan. 21, 1958 |